United States Patent [19]

Müllenberg

[11] Patent Number: 4,557,621
[45] Date of Patent: Dec. 10, 1985

[54] CLAMPING DEVICE

[76] Inventor: Ralph Müllenberg, Im Wiesengrund 6, D-4048 Grevenbroich 12, Fed. Rep. of Germany

[21] Appl. No.: 668,906

[22] Filed: Nov. 7, 1984

[30] Foreign Application Priority Data

Dec. 1, 1983 [DE] Fed. Rep. of Germany ....... 3343446
Sep. 21, 1984 [DE] Fed. Rep. of Germany ....... 3434690

[51] Int. Cl.[4] ............................................. F16D 1/06
[52] U.S. Cl. ....................................... 403/16; 403/370
[58] Field of Search ........................... 403/370, 371, 16

[56] References Cited

U.S. PATENT DOCUMENTS 4,268,185  5/1981  Mullenberg ......................... 403/370
4,396,310  8/1983  Mullenberg ....................... 403/370 X
4,407,603 10/1983  Lundgren ............................ 403/370
4,471,846  9/1984  Mullenberg ................... 24/136 B X

FOREIGN PATENT DOCUMENTS 2017149 10/1971  Fed. Rep. of Germany ...... 403/370
2322831  5/1974  Fed. Rep. of Germany .
2329940  1/1975  Fed. Rep. of Germany .
2819069 10/1979  Fed. Rep. of Germany .
 622461  5/1949  United Kingdom .
 837276  5/1956  United Kingdom .

Primary Examiner—Andrew V. Kundrat
Attorney, Agent, or Firm—Schwartz, Jeffery, Schwaab, Mack, Blumenthal & Evans

[57] ABSTRACT

A clamping device for the fastening of a hub on a shaft, with a tapered flange ring having a cylindrical circumferential surface, with a conical circumferential surface radially opposing the surface and with a radial flange and with two taper parts capable of being tightened by means of axial clamping screws, with conical surfaces intended for cooperation with the tapered surface of the tapered flange ring. Control of the stress distribution along the shaft and security against overloads without slipping on the shaft are also obtained.

6 Claims, 8 Drawing Figures

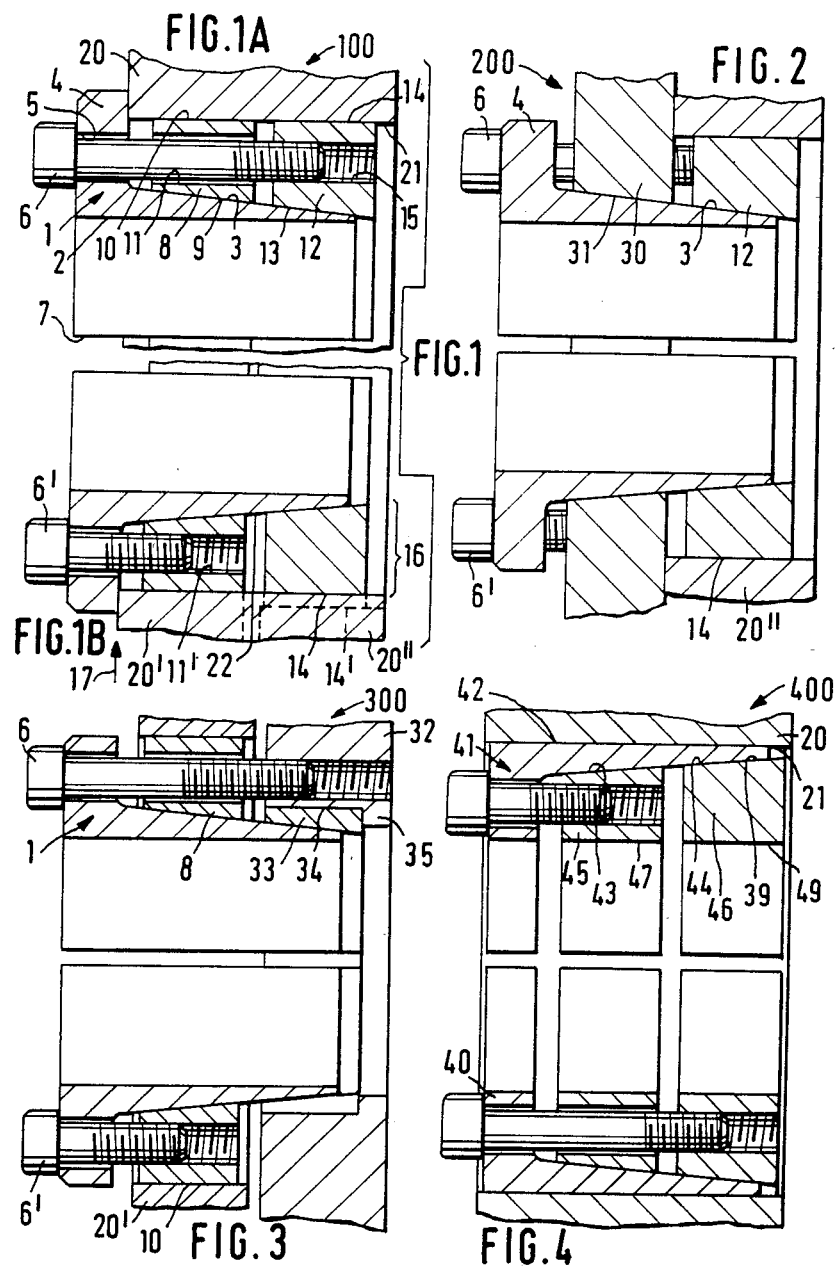

CLAMPING DEVICE

BACKGROUND

1. Field of the Invention

The invention relates to a clamping device, and more particularly to a clamping device for fastening an external structural part assembly to a shaft.

2. Prior Art

A clamping device of this type is known in the form of a so-called clamping set illustrated in German Specification No. 20 17 149. The relatively thin walled taper ring flange is located with its cylindrical inner circumferential surface on a shaft which constitutes the inner structural component. The conical part is in the form of a taper ring with its conical inner circumferential surface cooperating with the external circumferential surface of the taper ring flange and possessing a cylindrical outer circumferential surface arranged in a hub.

It has been found in actual practice that the stress distribution along the shaft, i.e. the specific surface pressure whereby the taper ring flange is pressured against the shaft, is not as uniform as it should theoretically be, but that a strong increase in stress is experienced toward the thin walled end of the taper ring flange. This is especially true if in the tightened state the taper ring slightly protrudes in the axial direction past the thin walled end of the tapered flange. These high edge stresses are superimposed on the state of stress prevailing in the shaft as the result of the torque and possibly of bending stresses so that excessive relative stresses may occur in the area of the end of the tapered flange ring. These in turn may lead to plastic deformations and, in the case of rotating bending stresses, even to an alternating stress which in extreme cases may become the cause of cracking of the shaft.

OBJECTS AND SUMMARY

It is the object of the invention to further develop a clamping device in a manner such that the stress distribution along the axis may be affected in a certain degree, and in particular the excess stress at the end of the tapered flange ring may be avoided.

The basic concept consists of eliminating the excessive increase in stress taking place in the case of a conical part extending essentially over the axial length of a tapered flange at its end, upon tightening to a predetermined clamping level. This is accomplished by dividing the conical part into several separately actuable conical parts, wherein the conical parts near the flange may be tightened to the extent required to assure the transfer of a predetermined torque, while the conical part arranged at the height of the free end of the tapered flange ring is tightened independently of the former only to a degree necessary for the attainment of permissible surface pressures. In this manner, the stressing of the conical part or parts adjacent to each other in the flange may be effected to a level necessary for the transfer of the torque desired, without having unacceptably high edge stresses.

In conical clamping devices of the above mentioned type fundamentally two configurations are known. The outer structural component assembly may have a conical surface itself which cooperates with the external conical surface of the tapered flange ring. One embodiment of the invention includes the outer conical surface of the tapered flange ring where two structural parts are located possessing internal conical surfaces seated directly on the conical surface of the tapered flange ring. The "conical part" and the "outer structural part" are thus identical.

Since in actual practice the parts of the clamping device itself are normally made by a manufacturer other than the manufacturer of the structural parts to be clamped and the latter usually purchases the parts of the clamping device in the form of a complete unit, and further since it is possible to correlate the conical surfaces in relation to the angle of inclination and surface quality with the accuracy required with great effort only, clamping devices of this type are frequently designed as so-called clamping sets. These include their own conical rings with a cylindrical circumferential surface cooperating with the tapered flange ring. The outer structural part in this case does not act directly in cooperation with the conical surface of the tapered flange ring, but merely has a cylindrical bore into which the "clamping set" is inserted. Cylindrical bore holes do not pose problems with regard to alignment.

The term "structural part arrangement" comprises both the case wherein a single piece structural element with a cylindrical recess is involved, with two taper rings located on a tapered flange ring cooperating with it, and the case where there are, for example, two separate structural elements arranged in succession in the axial direction, with at least one of them located on a taper ring.

This form of embodiment of the clamping device according to the invention provides an important additional advantage that may be of great importance in many cases. If, for example, in the embodiment of DE-OS No. 20 17 149, FIG. 1, with identical slide pairings being assumed on the shaft and in the hub bore (overwhelmingly steel), the torque transmitted increases, slipping will always occur first on the shaft as its radius is smaller. Correspondingly, for a given torque the circumferential forces that must be held by friction are larger. Slipping on the shaft is, however, extremely undesirable in many cases, as the shaft will be damaged by scoring and the removal of the clamping device made more difficult.

The aforementioned embodiment offers the possibility of providing safety against an overload, without slipping occurring on the shaft. Rather, the outer structural element seated on the taper ring slips on its cylindrical surface. This is obtained by the fact that the tapered flange ring is held on the shaft, not exclusively by the radial forces acting on the structural element involved, but also by the radial forces acting between the tapered flange ring and the adjacent structural part. The tapered flange ring is thus held to some extent additionally on the shaft by artificial means, so that it does not slip under the effect of a torque applied to a structural element, and slipping occurs first on the cylindrical surface of the taper ring associated with the structural element involved, i.e. outside the shaft.

Layouts with structural elements arranged adjacent to each other on a shaft are rather common, for example in adjacently placed toothed gears, chain gears and crank gears with the drive wheel adjacent to the crank.

The clamping device is tightened by means of axial straining screws distributed over the circumference and passing through the flange of the tapered flange ring. Accordingly, for the tightening of two conical parts or taper rings seated on the same taper flange ring, two sets of such straining screws must be present. As the number of straining screws that may be placed on the circumference of the flange is limited, the number of straining screws acting on each individual conical part or taper ring is also restricted to approximately one-half of the maximum number. The maximum axial tensile force and correspondingly the radial clamping force and the transferable torque are also limited.

Another embodiment of the invention includes a large number of straining screws for each individual conical part or taper screws.

The conical part adjacent to the flange is initially tightened by means of straining screws with larger diameters, distributed over the circumference without appreciable intervals (with the possible exception of forcing threads) to the tightness desired. These straining screws are then removed while the clamping remains because of the self-locking of the cone angle. Subsequently, the auxiliary ring is placed in front of the flange, and the straining screws with the lesser diameter are screwed through the passage bore holes of the flange and the threaded bores of the conical part adjacent to the flange into the threaded bores of the next conical part and tightened. In this manner, every conical part may be tightened by means of a full set of straining screws completely filling out the circumference.

In order to equalize the lesser diameter of the second set of straining screws, the part removed from the flange of the tapered flange ring and the conical part cooperating with it may have a reduced angle of inclination of the cone. The radial force obtainable with a given axial force is then correspondingly higher.

Yet another embodiment is of special importance in cases in which the limited mechanical strength of a structural part renders it difficult to achieve adequately high clamping forces. This is the case, for example, when the hubs are made of gray cast iron or aluminum. Here, by virtue of the invention of the structural element involved may be loaded to a still permissible radial stress and an appreciable additional frictional lock generated, which also benefits the first structural part.

BRIEF DESCRIPTION OF THE DRAWINGS

The above and other objects of the invention will become more apparent from the following description with reference to the accompanying drawings which illustrate the invention in a schematic manner and wherein:

FIGS. 1A and 1B to 7 illustrate longitudinal sections through the various clamping devices wherein the shaft forming the inner structural element is eliminated in FIGS. 1 to 6 and shown in FIG. 7, while the outer structural parts are merely indicated.

DETAILED DESCRIPTION

Figure 5:
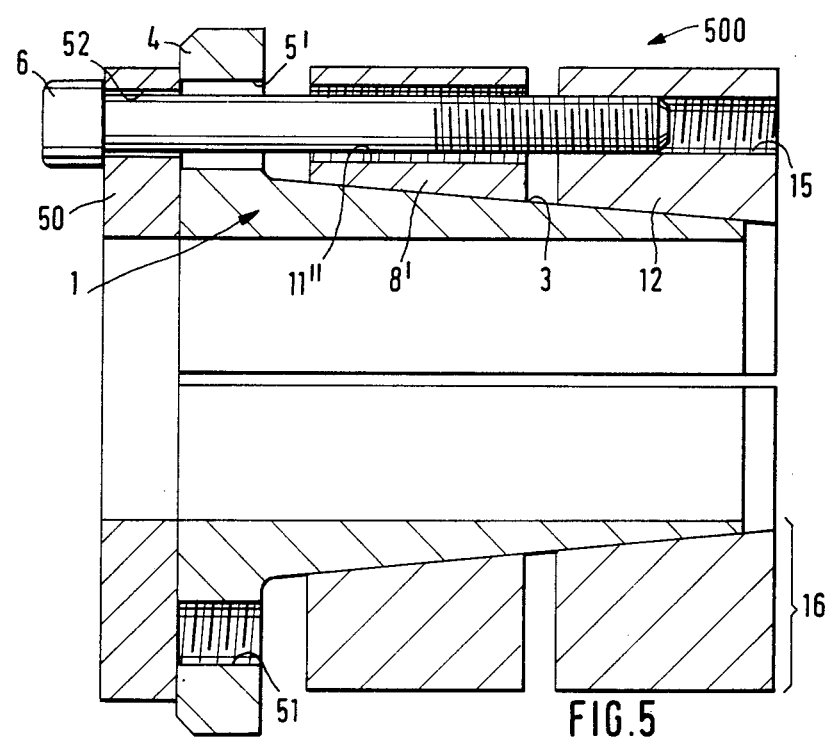

In the clamping device illustrated in FIG. 1 and designated in its entirety by 100, a tapered flange ring 1 is present; it rests with its cylindrical internal circumferential surface 2 on a shaft (not shown). On the opposite side, the tapered flange ring 1 has an outer conical surface 3, the apex of which is to the right in FIG. 1, so that the thick walled end of the tapered flange ring 1 is located to the left, on the side of a radial flange 4 protruding on the side of the conical surface 3, i.e. to the outside. The radial flange 4 has a plurality of passage bores 5 distributed over the circumference, through which a plurality of clamping screws 6, 6' and optionally unclamping screws (not shown) pass. The tapered flange ring 1 is provided at one point with a longitudinal slit 7, so that it is readily deformed in the radial direction, and the clamping force of the screws 6, 6' is not lost merely to deform the tapered flange ring 1.

On the tapered flange ring 1, adjacent to the flange 4, a first taper ring 8 with an internal conical surface 9 cooperates with the conical surface 3. It further has an outer cylindrical circumferential surface 10 arranged over it. The first taper ring 8 contains a plurality of passage bores 11 for the clamping screws 6 and a plurality of threaded bores 11' for the clamping screws 6'. The clamping screws 6' draw the taper ring 8 to the left in accordance with FIG. 1, whereby the conical surfaces 9, 3 slide on each other, and the taper ring 8 is expanded radially. In order to facilitate this deformation, the taper ring 8 has a longitudinal slit (not shown).

Positioned adjacent to the taper ring 8 in the axial direction, on the tapered flange ring 1, is a second slit taper ring 12 with an inner conical surface 13 and a cylindrical outer circumferential surface 14. The taper ring 12 comprises a plurality of threaded bores 15 for the clamping screws 6. The latter screws pass through the taper ring 8 and engage the taper ring 12 in order to draw it to the left in FIG. 1 with a force that may be adjusted independently of the clamping screws 6'.

The two cylindrical outer circumferential surfaces 10, 14 of the taper rings 8, 12 rest against a cylindrical inner circumferential surface 21 which has the same diameter as the recess of an outer structural element, which in the example shown on top in FIG. 1 is a single piece structural part. Upon the tightening of the clamping screws 6, 6', the shaft (not shown) is fixedly secured in rotation in the recess 21 by a frictional lock.

The taper ring 8 near the flange may be tightened by means of the clamping screws 6' with any force that may be desired. The tightening force of the taper ring 12 may be regulated independently of the foregoing by means of the clamping screws 6, so that the unacceptable peak stress otherwise readily appearing at the end to the right in FIG. 1 of the tapered flange ring 1 is avoided.

As illustrated in the lower half of FIG. 1 the diameters of the cylindrical surfaces 10, 14 may also be different, as shown by the broken line 14', so that the bore 21 is a stepped bore hole. In particular, however, the outer structural element layout represented in the upper half of FIG. 1 by the single piece part 20, may also consist of a pair of structural elements 20',20", which abut against each other in a radial plane 22 or else are spaced apart axially, as indicated by the broken line. Each element 20',20" is associated with a taper ring 8 and 12. But the two elements 20', 20" are seated on a common tapered flange ring 1.

This configuration makes it possible to provide an overload safety feature, whereby in the case of an overload, slipping takes place, but not on the shaft. If a torque acts on one of the structural elements 20', 20", which in view of a given state of stress can no longer be transmitted by means of a friction lock involving for example the element 20", the latter will slip on the cylindrical circumferential surface 14 and not on the shaft. This is because the tapered flange ring 1 is clamped to the shaft in addition to the radial forces transmitted by the taper ring 12 and also by the radial forces transmitted by the taper ring 12, thereby corrspondingly raising its slipping threshold.

To the extent that in the forms of embodiment hereafter identical parts are present, identical reference symbols are applied.

The principal difference of the clamping device 200 of FIG. 2 relative to the clamping device 100 of FIG. 1 consists of the fact that a conical inner circumferential surface 31 is applied directly to a structural part 30 near the flange, i.e. no separate taper ring is provided which would be arranged in a cylindrical recess of the part 30. This results in the fact that the structural part layout is no longer separable from the clamping parts and that the clamping device 200 does not comprise a separate clamping set 16 forming in itself a closed unit, as in FIG. 1. Otherwise, the clamping device 200 also has two structural elements 20", 30, arranged adjacent to each other in the axial direction, but spaced apart, wherein an overload safety feature is again provided for the part 20" in a similar manner by slipping on the cylindrical circumferential surface 14 of the taper ring 12, as in FIG. 1.

A further difference of the clamping device 200 resides in the fact that the element 30 rests against the flange 4, as is the case of location 17 in FIG. 1 with respect to element 20'. This in turn results in the fact that upon the tightening of the clamping screws 6, 6' the structural elements 30 and 20" are displaced to the left a small distance with respect to the shaft (not shown). In many cases this is immaterial. The advantage is that sliding takes place along the conical surface 3 only, and the friction must be overcome at this location only. In the form of the embodiment according to FIG. 1, upon the tightening of the screws 6, 6' sliding takes place both on the conical surface 3 and on the inner circumferential surface 21 of the outer structural part 20. Even though, due to its abutting at 17, the outer structural part 20 remains exactly at its location, the greater part of the clamping force is lost to friction.

In the clamping device 300 of FIG. 3 the element 20' is again seated on the taper ring 8. The clamping screws 6 directly engage the element 32 so that a rotation of the latter is thereby prevented. However, the flange cone bushing 1 also clamps the shaft (not shown) so that slipping may take place only on the cylindrical surface 10. The inner conical surface of the structural element 32 is formed by a relatively thin walled, tapered and slit insert 33, which is inserted in a cylindrical bore 34 of the element 32 and secured by a collar 35 against slipping under the effect of the clamping screws 6.

While the taper ring 1 in FIGS. 1 to 3 is seated with its cylindrical inner circumferential surface 2 on the shaft (not shown), in FIG. 4 a taper ring 41 has a cylindrical outer circumferential surface 42 resting against the inner circumference 21 of the outer structural element 20. A conical surface 39 of the tapered flange ring is the internal tapered surface and is cooperating with the outer taper surfaces 43, 44 of taper rings 45, 46, which are seated with their cylindrical inner circumferential surface 47, 49 on the shaft (not shown). The radial flange 40 is pointed inward.

The clamping device 400 is applicable only to single piece outer structural parts 20 and is only able to reduce the peak stress at the edge to the right in FIG. 4 of the tapered flange ring 41 in the manner described for FIG. 1, but not as a safety against overloading. As however the problem of the edge stress peak on the side of the hub, i.e. when the relatively thin walled tapered flange ring is not seated directly on the shaft, is not that great, the clamping device 400 should not be considered an important form of embodiment, even though it embodies the concept of the invention.

To release the clamping devices described above, longer forcing or unclamping screws are screwed into the short clamping screws 6', pressing against the locations without threads of the right hand taper rings. In this manner, the right hand taper ring may be forced off. To pressure the left hand taper rings off, forcing threads (not shown) are provided in the flange 4, 40, into which the unclamping screws may be inserted. They press against locations of the left hand taper rings without threads, thereby forcing or unclamping them off the tapered flange ring.

The clamping device 500 of FIG. 5 essentially corresponds to the clamping device 100 of FIG. 1. The principal difference is that straining screws of two different diameters are used. The taper ring 8' comprises a plurality of threaded bores 11" having diameters such that the threaded bolts with the smaller diameter used may be inserted through them, whereby they serve as passage bores. The passage bore 5' in the flange 4 of the tapered flange ring 1 is again dimensioned for the larger diameter. The threaded bores 15 in the taper ring 12 correspond to the lesser screw diameter. For example, the larger screw diameter may amount to 14 mm, the smaller to 10 mm.

In the course of tightening the clamping device 500, which again represents a clamping set 16 forming a single unit, initially an auxiliary ring 50 resting against the outer frontal side of the flange 4 is eliminated. The taper ring 8' is drawn to the left onto the tapered flange ring 1 to the degree of clamping desired by means of the straining screws with the larger diameter, according to FIG. 5. If the straining screws with the larger diameter now remain loose, the tape ring 8' remains under stress, as the angle of inclination of the conical surface 3 is within the self-locking range. The auxiliary ring 50 is now placed in front of the flange 4, and the longer clamping screws 6 are screwed into the threaded bores 15 of the taper ring to the right in FIG. 5 through the passage bores 52 and 5' and the threaded bore 11" of the taper ring 8', whereby the taper ring 2 is tightened. The advantage of this layout consists of the fact that the pitch circle for the clamping screws may be fully utilized for both of the two taper rings 8' and 12, while in the forms of embodiment of FIGS. 1 to 4 the clamping screws 6' must be set between the clamping screws 6, whereby only one-half of the clamping screws remains available. Obviously, in both cases room must be provided for a certain number of unclamping screws 51.

Figure 6:
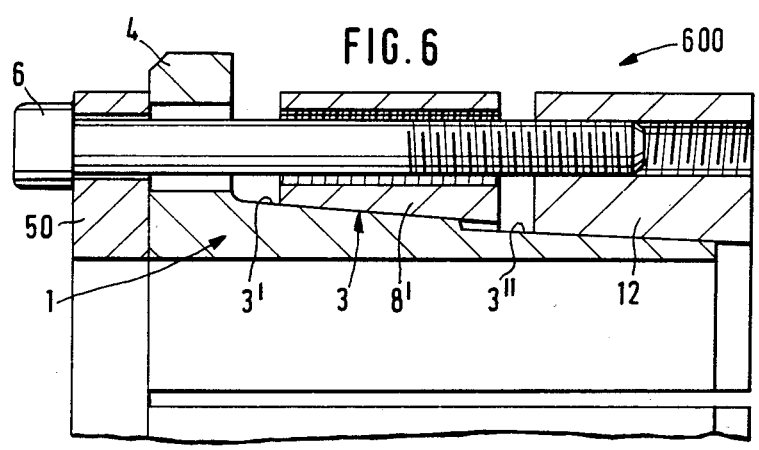

The clamping device 600 of FIG. 6 essentially corresponds to the clamping device 500, with the single difference that the conical surface 3 of the tapered flange ring 1 is divided into sections 3' and 3" in the axial direction, with the angle of inclination of both being located in the self-locking range, but with the angle of inclination of the section 3", located under the right hand taper ring 12 removed from the flange, being slightly smaller than that of the section 3'. Naturally, the angles of inclination of the conical surfaces of the taper rings 8' and 12 are suitably adapted. Due to the smaller angle of inclination of the section 3", higher radial pressures may be obtained in spite of the smaller screw diameters used for tightening.

Concerning the configuration of the external structural part layout not shown in FIGS. 5 and 6 the description given for FIG. 1 is valid. If a single piece structural element is involved which is engaged by two taper rings, the aspect of the effect on the stress distribution and the reduction of edge stresses are decisive. In the case of two structural elements arranged adjacent to each other, security against overloading is important. If only one structural part is present on one of the taper rings and the other, which then is unslit, is located outside the structural part, only overload security is involved. The other taper ring merely provides additional clamping of the tapered flange ring on the shaft.

Figure 7:
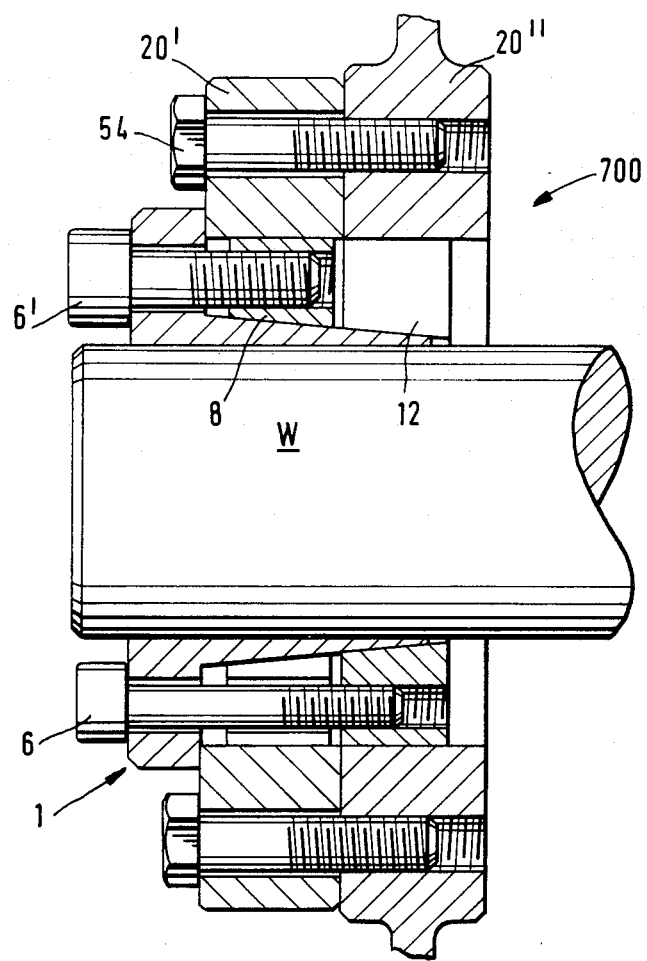

FIG. 7 shows a clamping device 700 serving to secure a structural part 20", for example a rope pulley, a toothed wheel, or the like, on the shaft W for the transmission of high torque. The structural part 20" is made of a material that is not particularly resistant to the radial stresses generated, for example by gray cast iron or aluminum. The clamping device 700 essentially corresponds to the configuration shown at the bottom of FIG. 1, with the difference that both elements 20', 20" are joined in rotation to each other by means of axial bolts 54. The structural element 20" is clamped onto the taper ring 1 by means of the slit taper ring 12 and the clamping screws 6, which is still permissible in view of the material of the element 20". The axially adjacent part 20' consists of an unslit steel ring, capable of applying considerable radial forces. By tightening the taper ring 8 by means of the screws 6', significant clamping may thus be obtained. The torque that the rings 8, 20' are capable of holding also benefits the element 20", as the latter is joined with the element 20' in rotation by means of the bolts 54.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A clamping device for fastening an external structural part to an inner structural part having a circular external circumferential surface, such as a shaft, comprising:
    (a) a tapered flange ring having a circular inner circumferential surface, a radially disposed conical circumferential outer surface and a radial flange projecting from said conical circumferential surface;
    (b) a conical part having a conical tapered surface cooperating with the conical circumferential surface of said tapered flange ring;
    (c) at least a plurality of axial clamping screws passing through said flange and engaging said conical part;
    (d) said tapered flange ring having at least one further conical part with a tapered circumferential surface cooperating with the tapered surface of said tapered flange ring; and
    (e) said further conical part being capable of being clamped to said tapered flange ring or forced from it by said plurality of screws.

2. A clamping device according to claim 1, wherein the recess of the outer structural part assembly is at least in part circularly cylindrical and that at least one of the tapered parts is a taper ring provided with a corresponding circularly circumferential surface.

3. A clamping device according to claim 1, wherein the outer structural part assembly comprises two separate structural parts arranged successively in the axial direction and wherein at least one of said two separate structural parts is arranged on a taper ring.

4. A clamping device according to claim 1, wherein the tapered surface of the tapered flange ring has an inclination within the self-locking range and in locations distributed over the circumference in the flange a plurality of passage bores and in the conical part adjacent to the flange a plurality of threaded bores for clamping screws of a first diameter and in the second taper part a plurality of threaded bores for clamping screws of a second, smaller diameter, are provided and an auxiliary ring is provided, said auxiliary ring comprising in locations corresponding to the passage bores of the flange a plurality of passage bores for clamping screws of the second diameter.

5. A clamping device according to claim 4, wherein the section removed from the flange of the tapered surface of the tapered flange ring and the conical part cooperating with it, have a lesser conical angle of inclination than the section adjacent to the flange of the tapered surface of the tapered flange ring and the conical part cooperating with it.

6. A clamping device according to claim 3, wherein the structural parts are rotationally joined to each other.

* * * * *